(12) United States Patent
Ballarotti

(10) Patent No.: US 8,997,819 B2
(45) Date of Patent: Apr. 7, 2015

(54) LABELLING MACHINE FOR LABELS PRINTED ON PRE-PASTED CONTINUOUS FILM

(75) Inventor: Mario Ballarotti, Marmirolo (IT)

(73) Assignee: P.E. Labellers S.p.A., Porto Mantovanto (IT)

(*) Notice: Subject to any disclaimer, the term of this patent is extended or adjusted under 35 U.S.C. 154(b) by 0 days.

(21) Appl. No.: 13/512,470

(22) PCT Filed: Nov. 24, 2010

(86) PCT No.: PCT/EP2010/068153
§ 371 (c)(1),
(2), (4) Date: May 29, 2012

(87) PCT Pub. No.: WO2011/067148
PCT Pub. Date: Jun. 9, 2011

(65) Prior Publication Data
US 2012/0234495 A1    Sep. 20, 2012

(30) Foreign Application Priority Data

Dec. 2, 2009   (IT) .............................. MI2009A2131

(51) Int. Cl.
*B32B 38/04*      (2006.01)
*B65C 9/18*       (2006.01)

(52) U.S. Cl.
CPC ............... *B65C 9/1819* (2013.01); *B32B 38/04* (2013.01); *B65C 2009/1838* (2013.01)

(58) Field of Classification Search
CPC .................... B65C 9/1819; B65C 2009/1838; B32B 38/04
USPC .................................. 156/510, 516, 517, 521
See application file for complete search history.

(56) References Cited

U.S. PATENT DOCUMENTS

| | | | |
|---|---|---|---|
| 4,758,300 A | | 7/1988 | King |
| 6,235,345 B1* | | 5/2001 | Williamson et al. .......... 427/282 |
| 6,591,886 B1 | | 7/2003 | Gonzalo |
| 2005/0034818 A1* | | 2/2005 | Prindiville .................... 156/517 |
| 2009/0078363 A1 | | 3/2009 | Kramer |
| 2010/0018650 A1 | | 1/2010 | Ballarotti |

\* cited by examiner

*Primary Examiner* — Mark A Osele
*Assistant Examiner* — Christopher C Caillouet
(74) *Attorney, Agent, or Firm* — Greer, Burns & Crain Ltd.

(57) ABSTRACT

A labelling machine for labels printed on pre-pasted continuous film, comprising a rotating carousel provided with elements for supporting the individual containers to be labelled, adapted to turn such containers about their own axis, and alignment elements and tension adjustment elements for the film that unwinds from a reel and a cutting and transfer drum comprises a structure for supporting actuation elements for individual blades designed to cut the labels, the supporting structure being adapted to support a number of circumferential portions of peripheral shells provided with film retention elements and adapted to be inserted in the gaps formed by the blades that are present in each one of the groupings, so as to form a continuous cylindrical surface for supporting the film.

4 Claims, 7 Drawing Sheets

LABELLING MACHINE FOR LABELS PRINTED ON PRE-PASTED CONTINUOUS FILM

TECHNICAL FIELD

The present invention relates to a labelling machine for labels printed on pre-pasted continuous film.

BACKGROUND ART

Labelling machines are known that are designed for the application on containers of labels printed on a continuous film that is wound in the form of a reel.

Such machines comprise a rotating carousel provided with supporting plates for the individual containers, adapted to turn the containers about their own axis, and the continuous film that unwinds from the reel arrives, after being passed through several devices that ensure its alignment and correct tension, at a rotating drum provided with blades which is adapted to receive and retain, so that it clings to its own surface, the film in order to cut the labels and bring the individual labels, separated after cutting, into contact with corresponding containers supported by the carousel. The rotating drum is called "cutting and transfer drum".

Such machines suffer a lack of functional flexibility because they can function correctly only if they are used to operate on labels that have a length proximate to an optimal length that coincides substantially with the distance between two contiguous blades on the cutting and transfer drum, which is called the "pitch"; only in this case are the containers designed to receive the labels imparted a rotation speed about their own axis which first and foremost does not cause problems of stability for the containers which feature increasingly lower characteristics of resilience, and also ensures a good quality of tack of the label.

DISCLOSURE OF THE INVENTION

The aim of the present invention is therefore to devise a labelling machine that is provided with good characteristics of functional flexibility, so as to be capable of operating correctly on labels that have different lengths.

This aim and other objects that will become better apparent hereinafter are achieved by a labelling machine according to the invention, as defined in the appended claims.

BRIEF DESCRIPTION OF THE DRAWINGS

Further characteristics and advantages of the invention will become better apparent from the description of a preferred, but not exclusive, embodiment of the invention, illustrated by way of non-limiting example in the accompanying drawings wherein.

WAYS OF CARRYING OUT THE INVENTION

Figure 1:
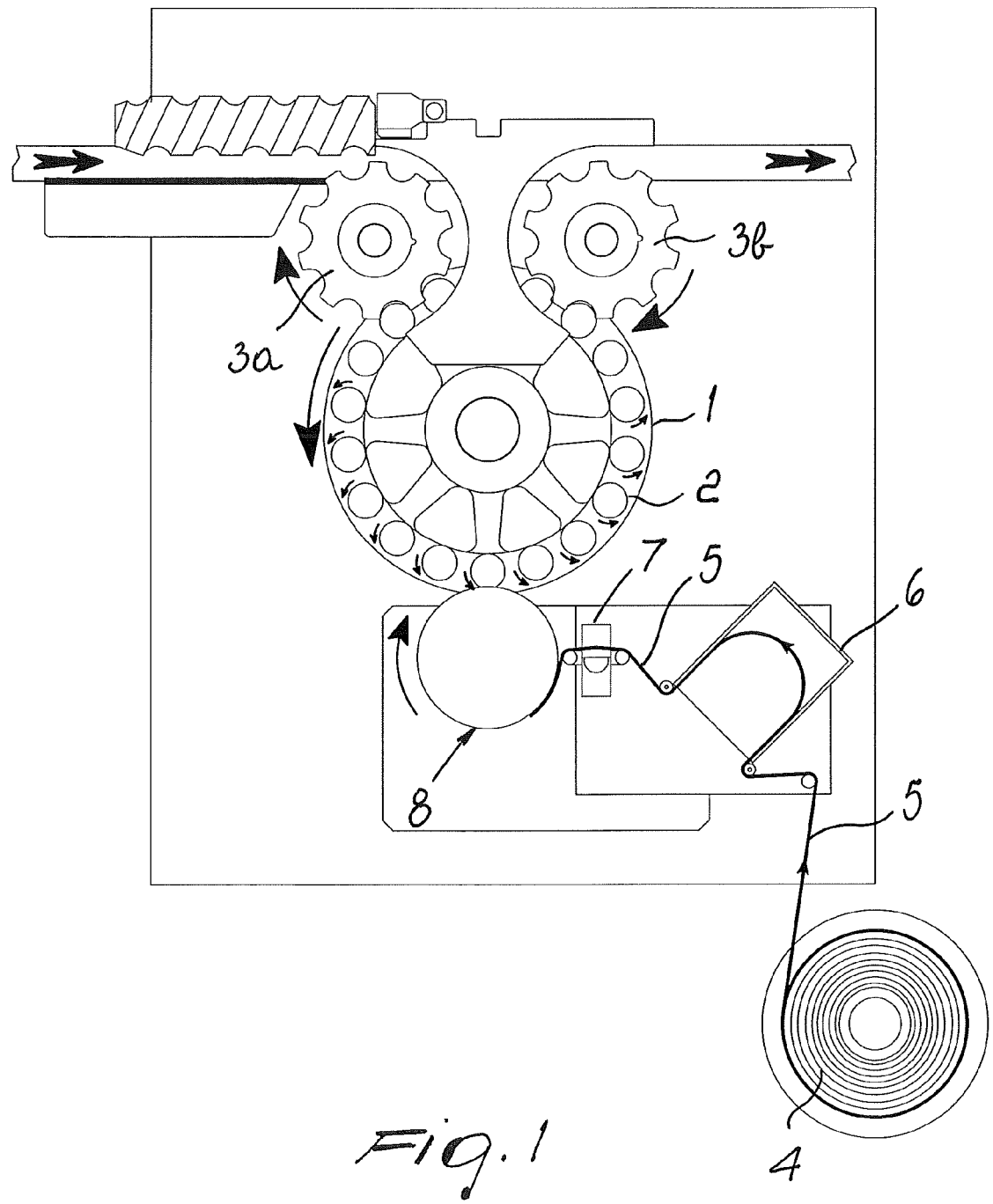
FIG. 1 shows a schematic plan view of a labelling machine according to the invention.

With reference to FIG. 1, the machine according to the invention comprises a carousel 1 which rotates in the direction of the arrow, and is provided with supporting means such as supporting plates 2 for individual containers turned about their own axis according to the arrows in the figure. The containers are arranged to arrive at the supports of the carousel by means of an intake star wheel 3a, and to be removed by means of an exit star wheel 3b.

The reference numeral 4 indicates a reel of pre-pasted film 5 that continuously produces the printed labels.

Upon unwinding from the reel 4, the film 5 passes to a device 6 for alignment and adjustment of tension and to a feeder 7, and finally arrives at a cutting and transfer drum 8 which is shown in FIG. 1 and which is now described in detail with reference to FIGS. 2 to 7.

Figure 4:
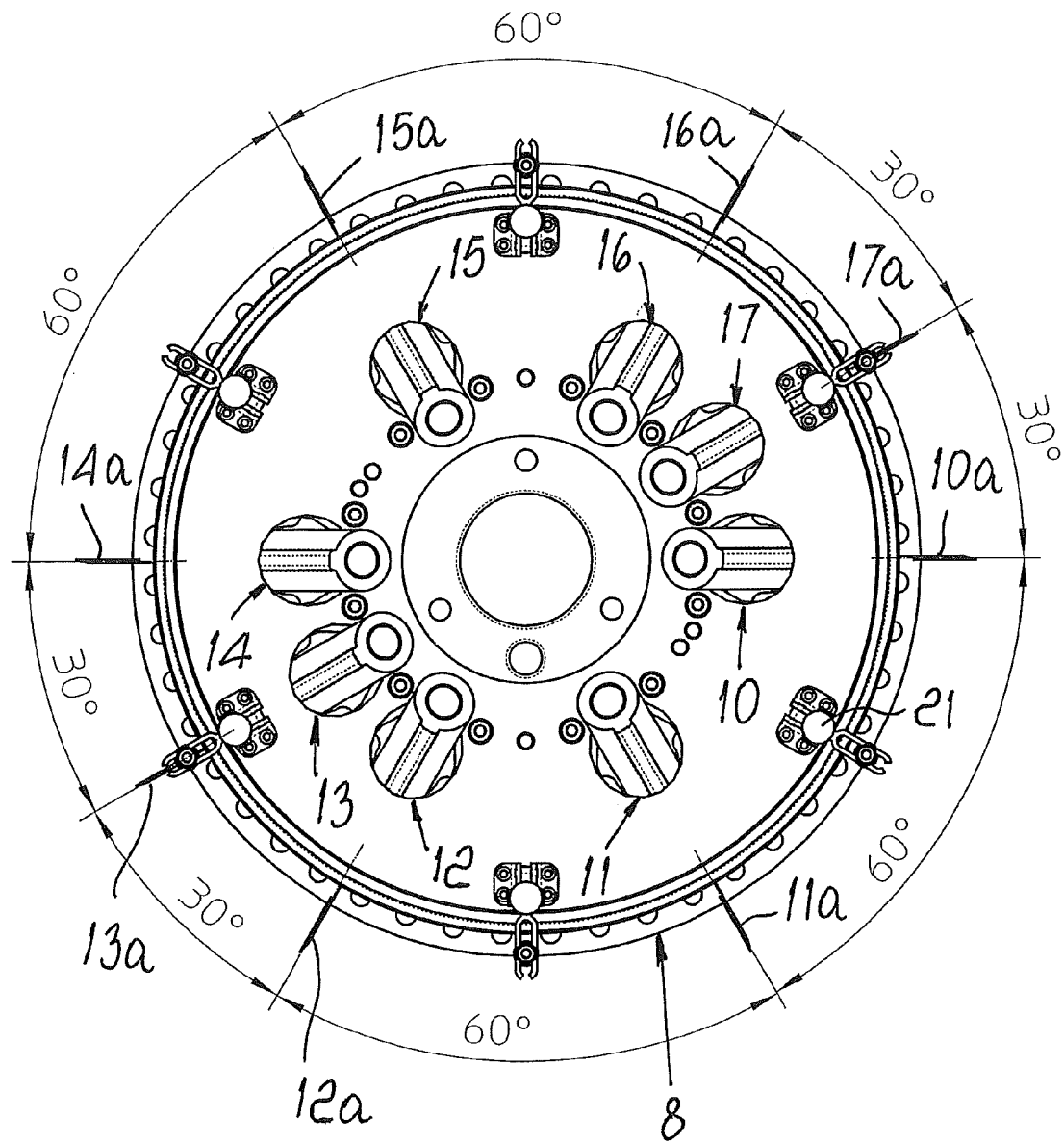
FIG. 4 shows a plan view of the cutting and transfer drum with the peripheral shells removed.

In these figures the reference numeral 9 indicates a structure for supporting actuation means for individual blades designed to cut the labels, which are indicated respectively with 10, 11, 12, 13, 14, 15, 16 and 17 and are associated respectively, as shown in FIG. 4, with the blades 10a, 11a, 12a, 13a, 14a, 15a, 16a and 17a.

FIG. 4 shows the mutual positioning of the actuation means, and therefore of the respective blades, on the supporting structure 9, and it can be seen that the blades 10a, 11a and the blades 11a, 12a are mutually spaced by 60°, the blades 12a, 13a and the blades 13a, 14a are spaced by 30°, the blades 14a and 15a and the blades 15a, 16a are spaced by 60° and, finally, the blades 16a, 17a and the blades 17a, 10a are spaced by 30°.

Figure 3:
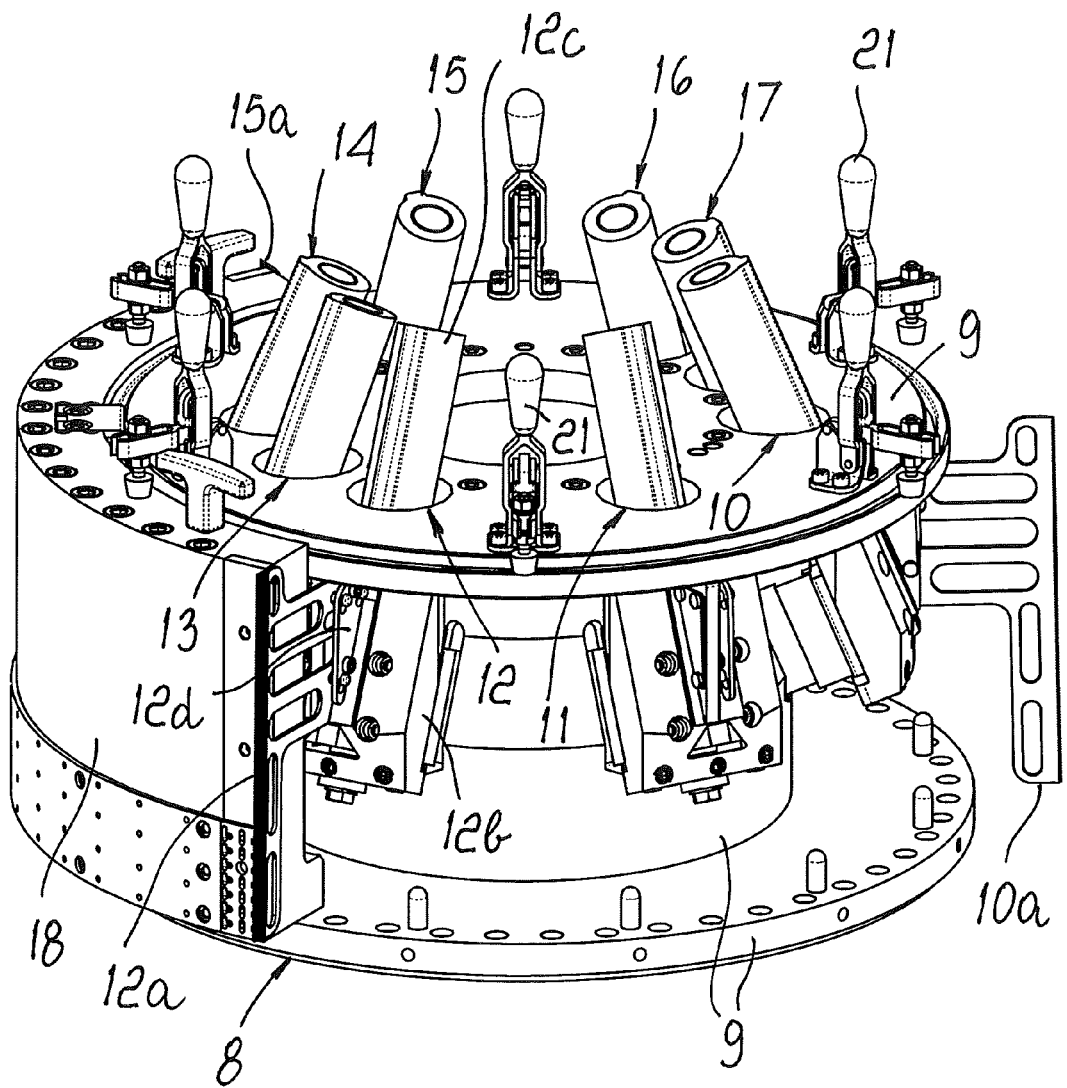
FIG. 3 is a perspective view of the cutting and transfer drum with two circumferential portions of peripheral shells removed.

FIG. 3 illustrates the shape of the actuation means for the blades designed to cut the labels. These means are all the same, and therefore only the means associated with the blade 12a will be described.

The means thus comprise a slider 12b actuated by a linear electric motor 12c, and provided with means for the quick coupling and uncoupling of the blade, in their turn comprising a plate 12d adapted to hold the blade against a ridge that stems from the slider following an action on screws by the user.

The actuation means are each provided with the corresponding blade according to three distinct groupings, such that each one causes the presence of a determined number of circumferentially equidistant blades.

With the addition of portions of peripheral shells which will now be described, three different configurations are defined.

Figure 2:
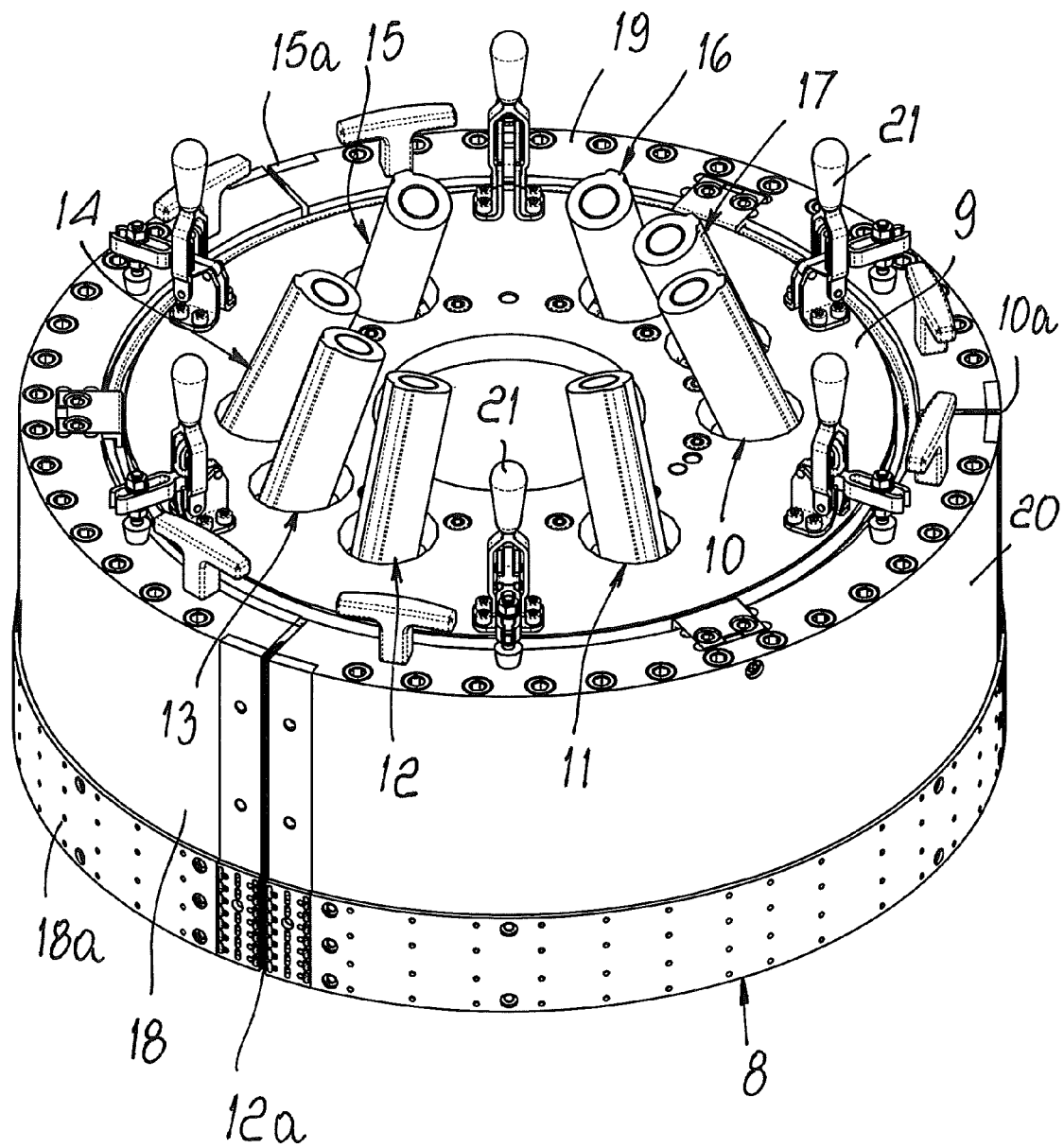
FIG. 2 is a perspective view of the cutting and transfer drum of the machine.
Figure 5:
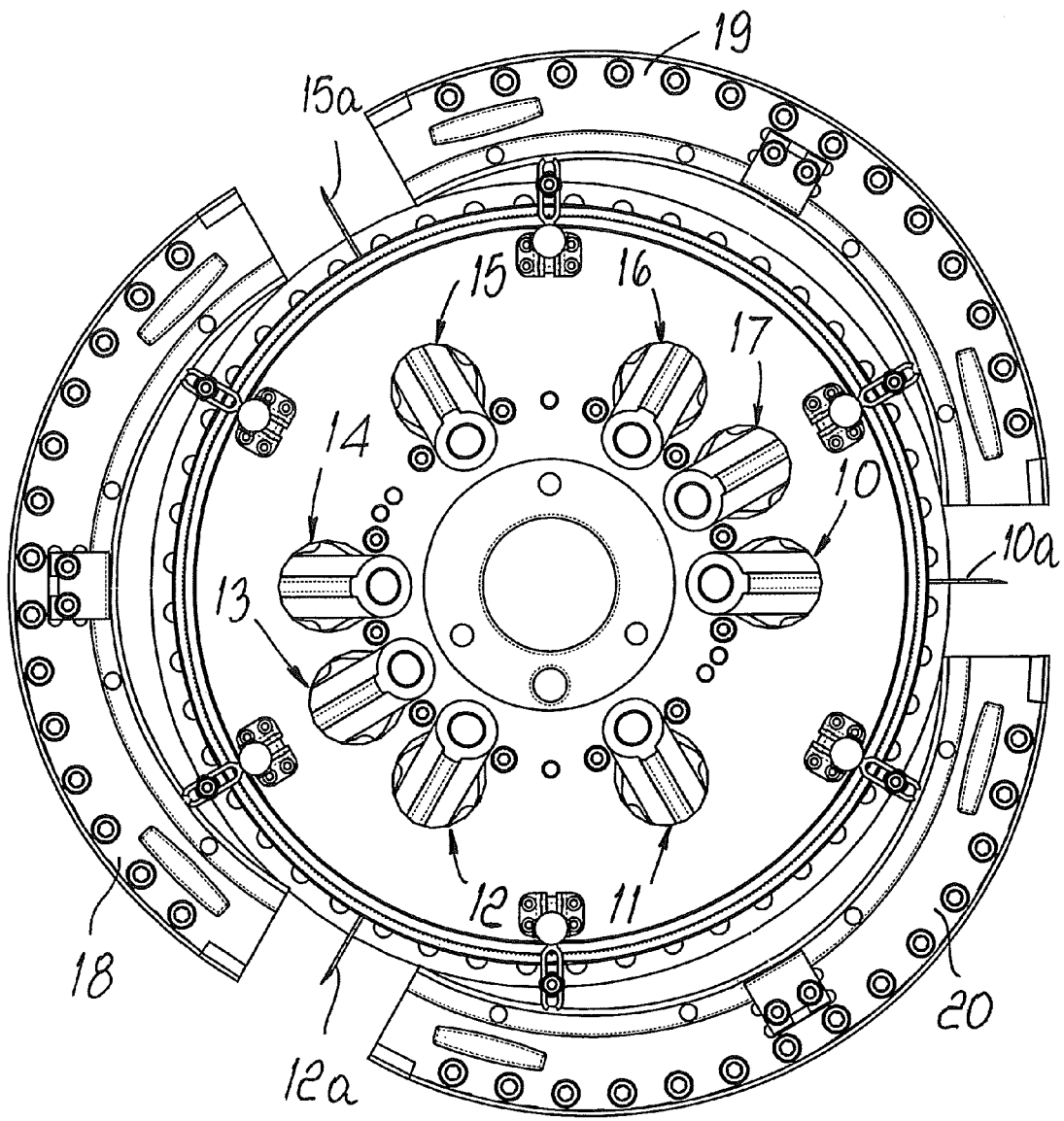
FIGS. 5, 6 and 7 show the three possible configurations that can be assumed by the cutting and transfer drum, with the circumferential portions of peripheral shells in a slightly exploded view.

A first configuration, shown in FIGS. 2, 3 and 5, provides for the presence of three blades 10a, 12a, 15a mutually spaced by 120°, and this configuration is completed by the first group of portions of peripheral shells provided with the drum according to the invention, indicated respectively with 18, 19, 20, provided with known means for retaining the film 5, so that it clings to its own surface, by aspiration of air through holes 18a, and removably locked by means of pressure levers 21. Such portions of peripheral shells are adapted to be inserted between the blades that are present so as to form, as can clearly be seen in FIG. 2 in particular, a continuous cylindrical surface for supporting the film.

Figure 6:
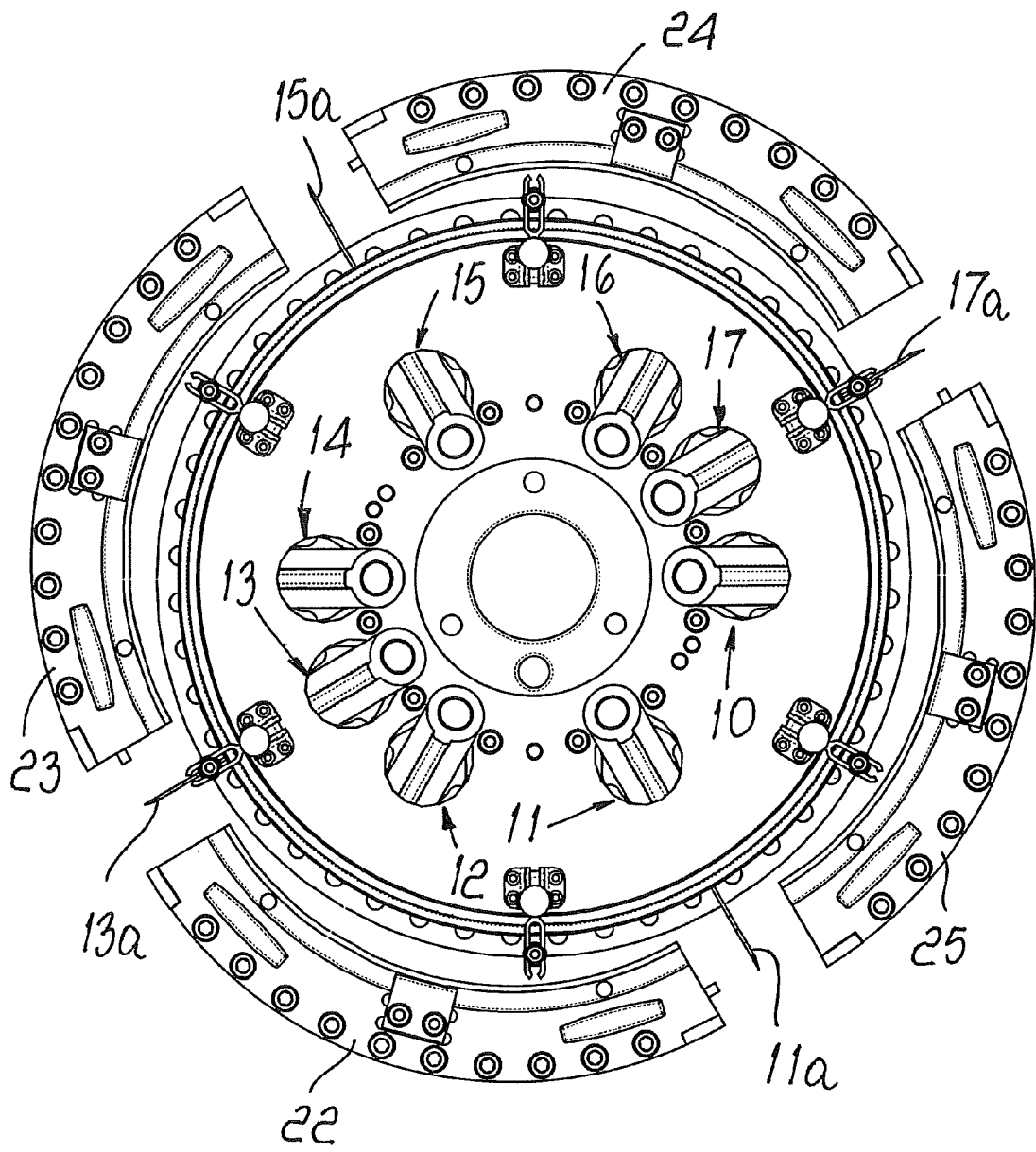

The second configuration, shown in FIG. 6, provides for the presence of four blades 11a, 13a, 15a, 17a mutually spaced by 90°, and this configuration is completed by the second group of portions of peripheral shells provided with the drum, indicated respectively with 22, 23, 24, 25.

Figure 7:
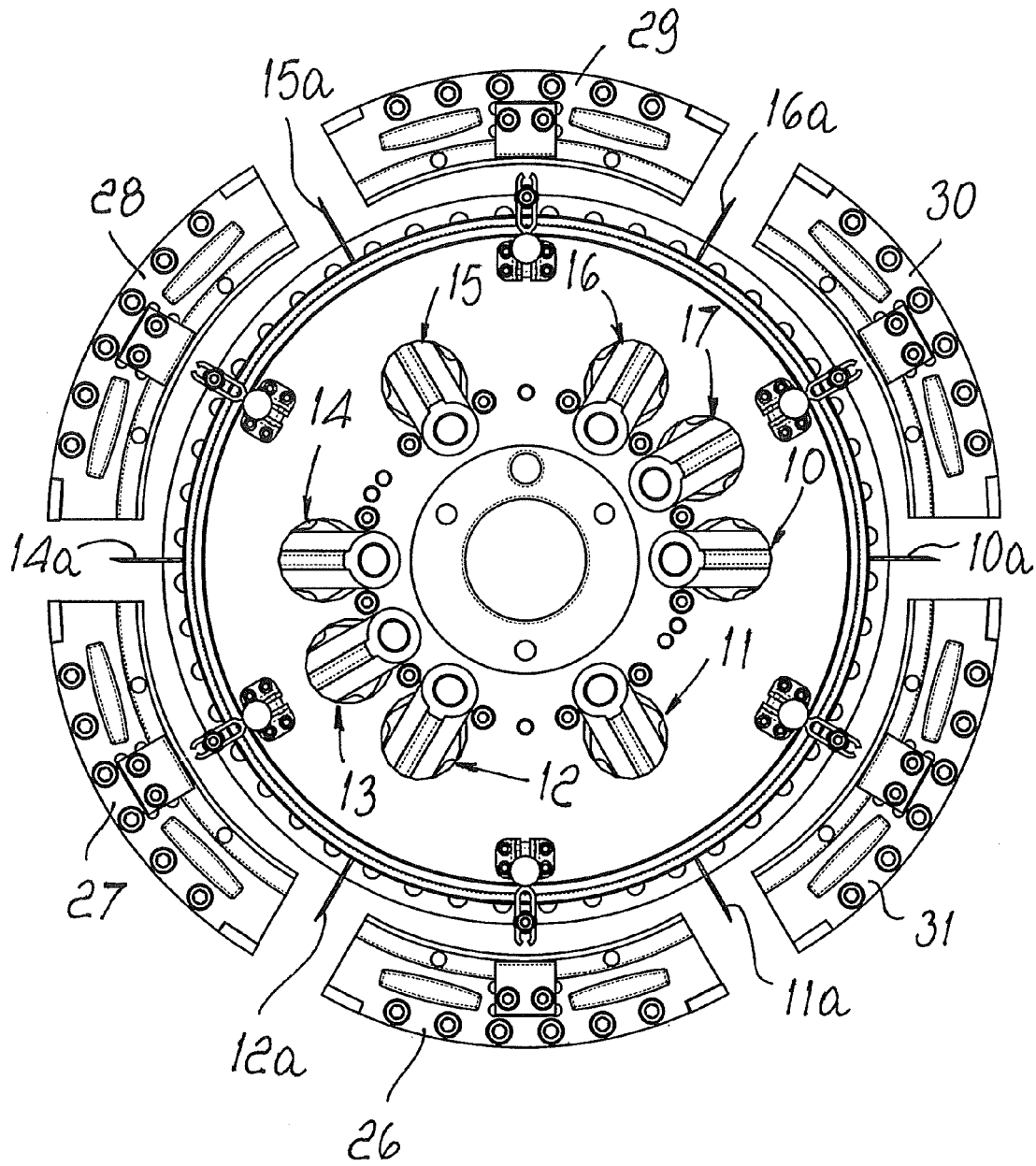

The third configuration, shown in FIG. 7, provides for the presence of six blades 10a, 11a, 12a, 14a, 15a, 16a mutually spaced by 60°, and this configuration is completed by the third group of portions of peripheral shells provided with the drum, indicated respectively with 26, 27, 28, 29, 30, 31.

It can thus immediately be seen how it is possible to optimise the functioning of the labelling machine according to the invention simply by changing, with very simple manoeuvres, the configuration of the cutting and transfer drum, thus passing from one of the configurations described above to the next, each configuration being characterised by a well-determined value of the pitch of the corresponding blades. Obviously the configuration to be selected will be the one which has the pitch value that is most proximate to the value of the length of the labels that the machine has to handle, and in this way the condition, which as previously disclosed underlies the optimisation of the operation, and which requires a substantial correspondence between the value of the pitch of the blades and the value of the length of the labels, will be sufficiently approximated.

The invention as described is susceptible of numerous modifications and variations, all of which are within the scope of the appended claims.

Moreover, all the details may be replaced with other technically equivalent elements.

The disclosures in Italian Patent Application No. MI2009A002131 from which this application claims priority are incorporated herein by reference.

The invention claimed is:

1. A labelling machine for labels printed on pre-pasted continuous film, comprising a rotating carousel provided with means for supporting individual containers to be labelled, adapted to turn said containers about their own axis, and further comprising alignment means and tension adjustment means for the film that unwinds from a reel and a cutting and transfer drum adapted to receive and retain, so that it clings to its own surface, the film that exits from a feeder in order to cut the labels and bring the individual labels, separated after cutting, into contact with corresponding containers supported by the carousel, wherein the cutting and transfer drum comprises a structure for supporting actuation means for individual blades designed to cut the labels, which are mutually spaced circumferentially and are adapted to be each provided with the corresponding blade according to distinct groupings, such that each one causes the presence of a predetermined number of circumferentially equidistant blades, said supporting structure being adapted to support, so that they are removably locked, for each one of said groupings, an adapted number of circumferential portions of peripheral shells provided with film retention means and adapted to be inserted in the gaps formed by the blades that are present in each one of said groupings, so as to define a continuous cylindrical surface for supporting the films, wherein the cutting and transfer drum comprises a structure for supporting means for actuating the individual blades designed to cut the labels, which are circumferentially mutually spaced according to a sequence that provides, in the following order, for angles between two contiguous blades which have values of 60° twice, 30° twice, 60° twice and 30° twice, there being a provision of circumferential portions of peripheral shells formed by three interchangeable groups, a first group being formed by three shells which extend circumferentially over 120°, a second group being formed by four shells which extend circumferentially over 90°, a third group being formed by six shells which extend circumferentially over 60°.

2. The labelling machine according to claim 1, wherein the actuation means for the actuation of the individual blades comprise a slider actuated by a linear electric motor and provided with means for the coupling and uncoupling of the corresponding blade.

3. A labelling machine for labels printed on pre-pasted continuous film, comprising a rotating carousel provided with means for supporting individual containers to be labelled, adapted to turn said containers about their own axis, and further comprising a device configured to align and tension the film that unwinds from a reel and a cutting and transfer drum adapted to receive and retain, so that it clings to its own surface, the film that exits from a feeder in order to cut the labels and bring the individual labels, separated after cutting, into contact with corresponding containers supported by the carousel, wherein the cutting and transfer drum comprises a structure for supporting actuation means for individual blades designed to cut the labels, which are mutually spaced circumferentially and are adapted to be each provided with the corresponding blade according to distinct groupings, such that each one causes the presence of a predetermined number of circumferentially equidistant blades, said supporting structure being adapted to support, so that they are removably locked, for each one of said groupings, an adapted number of circumferential portions of peripheral shells provided with film retention means and adapted to be inserted in the gaps formed by the blades that are present in each one of said groupings, so as to define a continuous cylindrical surface for supporting the films, said actuation means being adapted to actuate a selected number of said individual blades while simultaneously a selected number of said individual blades are not actuated, wherein said individual blades are mutually spaced circumferential such that a distance between one blade and a first blade arranged immediately adjacent to said one blade in a first direction is different than a distance between said one blade and a second blade arranged immediately adjacent to said one blade in a second direction opposite to said first direction.

4. The labelling machine according to claim 1, wherein said groupings each have a different number of said circumferential portions of peripheral shells.

* * * * *